(12) United States Patent
Kolar et al.

(10) Patent No.: US 10,805,185 B2
(45) Date of Patent: Oct. 13, 2020

(54) DETECTING BUG PATTERNS ACROSS EVOLVING NETWORK SOFTWARE VERSIONS

(71) Applicant: Cisco Technology, Inc., San Jose, CA (US)

(72) Inventors: Vinay Kumar Kolar, San Jose, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 15/896,183

(22) Filed: Feb. 14, 2018

(65) Prior Publication Data

US 2019/0253328 A1    Aug. 15, 2019

(51) Int. Cl.
| | |
|---|---|
| G06F 11/00 | (2006.01) |
| H04L 12/26 | (2006.01) |
| G06F 11/36 | (2006.01) |
| G06F 8/71 | (2018.01) |
| H04L 12/24 | (2006.01) |

(Continued)

(52) U.S. Cl.
CPC .............. *H04L 43/04* (2013.01); *G06F 8/71* (2013.01); *G06F 11/362* (2013.01); *H04L 41/0893* (2013.01); *H04L 41/145* (2013.01); *H04L 41/147* (2013.01); *H04L 43/045* (2013.01); *H04L 43/0823* (2013.01); *H04L 67/36* (2013.01); *G06N 20/00* (2019.01); *H04L 41/0213* (2013.01); *H04L 41/0631* (2013.01); *H04L 43/08* (2013.01)

(58) Field of Classification Search
CPC .................................. H04L 43/04; G06F 8/71
See application file for complete search history.

(56) References Cited

U.S. PATENT DOCUMENTS 8,191,099 B2    5/2012   Johnson et al.
9,619,363 B1 *  4/2017   Chitale ............... G06F 11/3692
(Continued)

FOREIGN PATENT DOCUMENTS

CN            101060688 B      1/2012

OTHER PUBLICATIONS

Bhattacharya, et al., "Graph-Based Analysis and Prediction for Software Evolution", 2012 34th International Conference on Software Engineering (ICSE), 11 pages, 2012, IEEE.

*Primary Examiner* — Jonathan D Gibson
(74) *Attorney, Agent, or Firm* — Behmke Innovation Group LLC; Kenneth J. Heywood; Jonathon P. Western

(57) ABSTRACT

In one embodiment, a network assurance service that monitors a network receives telemetry data regarding monitored characteristics of the network. The service identifies, using a machine learning-based pattern analyzer, a pattern of the monitored characteristics that are associated with failures experienced by one or more networking devices in the network. The service groups networking devices by software version. The service determines probabilities of the pattern being observed concurrently with failures of the grouped network networking devices. A particular probability is associated with a particular group of the networking devices executing a particular software version. The service provides, based on the determined probabilities, data regarding the identified pattern and software versions for display.

20 Claims, 10 Drawing Sheets

(51) Int. Cl.
*H04L 29/08* (2006.01)
*G06N 20/00* (2019.01)

(56) References Cited

U.S. PATENT DOCUMENTS

| | | | |
|---|---|---|---|
| 2009/0052411 A1* | 2/2009 | Leung | H04L 12/413 |
| | | | 370/338 |
| 2009/0059875 A1* | 3/2009 | Matthews | H04W 24/06 |
| | | | 370/338 |
| 2015/0178066 A1* | 6/2015 | Horn | G06F 8/65 |
| | | | 717/161 |
| 2017/0126476 A1* | 5/2017 | Curtin | H04L 41/0631 |
| 2019/0140912 A1* | 5/2019 | He | H04L 43/0817 |
| 2019/0253328 A1* | 8/2019 | Kolar | G06F 11/362 |

\* cited by examiner

… (US 10,805,185 B2)

DETECTING BUG PATTERNS ACROSS EVOLVING NETWORK SOFTWARE VERSIONS

TECHNICAL FIELD

The present disclosure relates generally to computer networks, and, more particularly, to detecting bug patterns across evolving network software versions.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
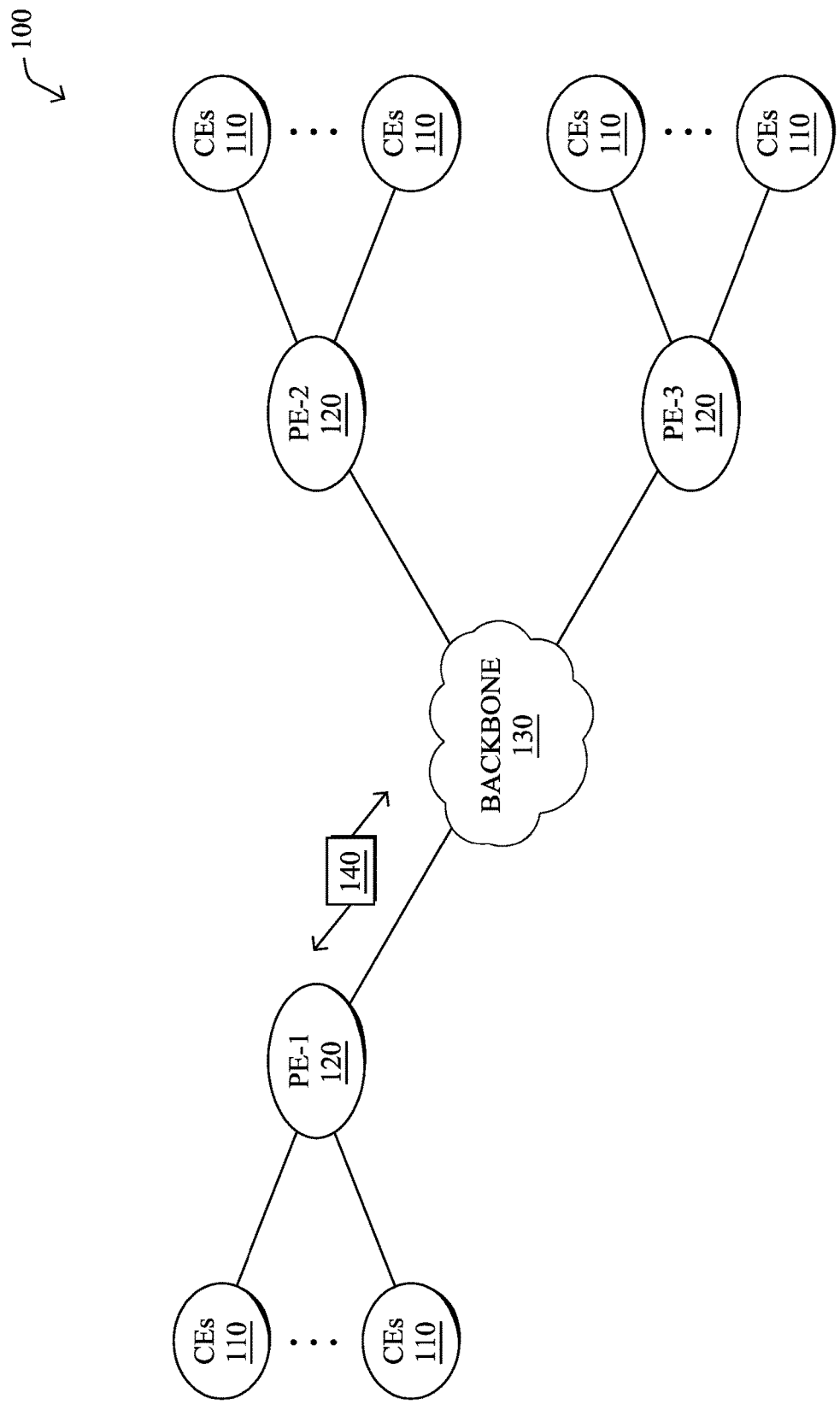
FIGS. 1A-1B illustrate an example communication network.

According to one or more embodiments of the disclosure, a network assurance service that monitors a network receives telemetry data regarding monitored characteristics of the network. The service identifies, using a machine learning-based pattern analyzer, a pattern of the monitored characteristics that are associated with failures experienced by one or more networking devices in the network. The service groups networking devices by software version. The service determines probabilities of the pattern being observed concurrently with failures of the grouped network networking devices. A particular probability is associated with a particular group of the networking devices executing a particular software version. The service provides, based on the determined probabilities, data regarding the identified pattern and software versions for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection. 2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
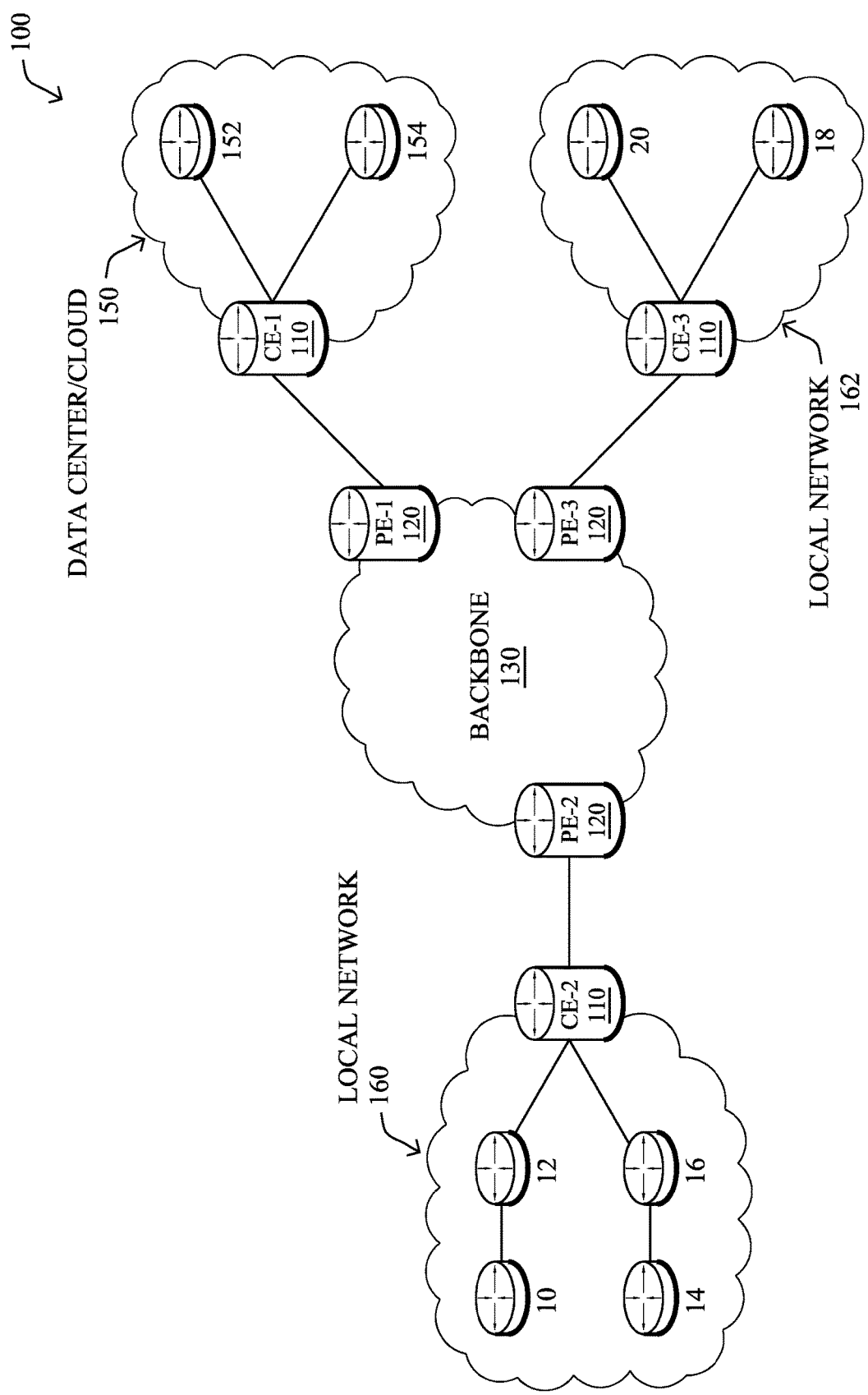

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
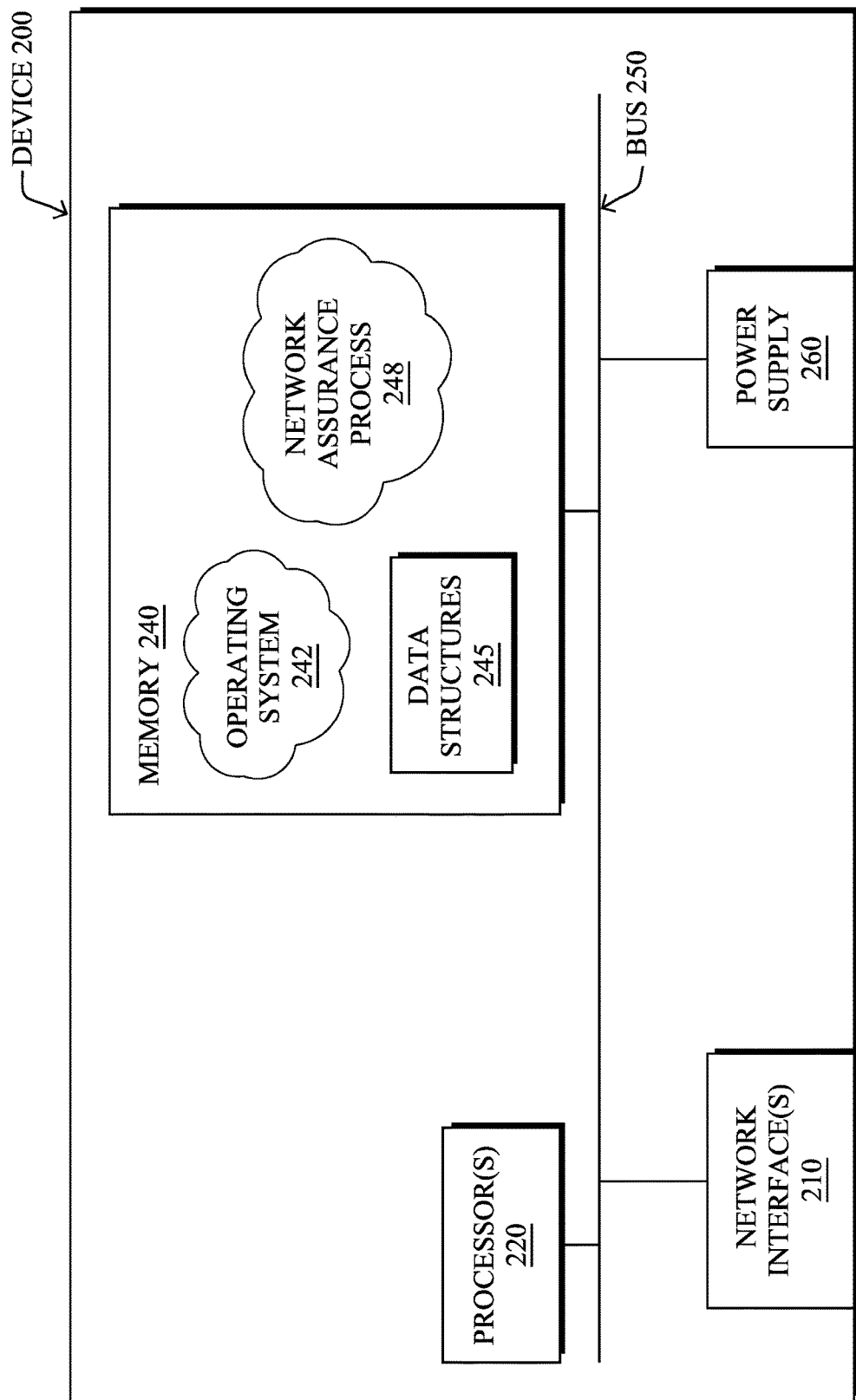
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
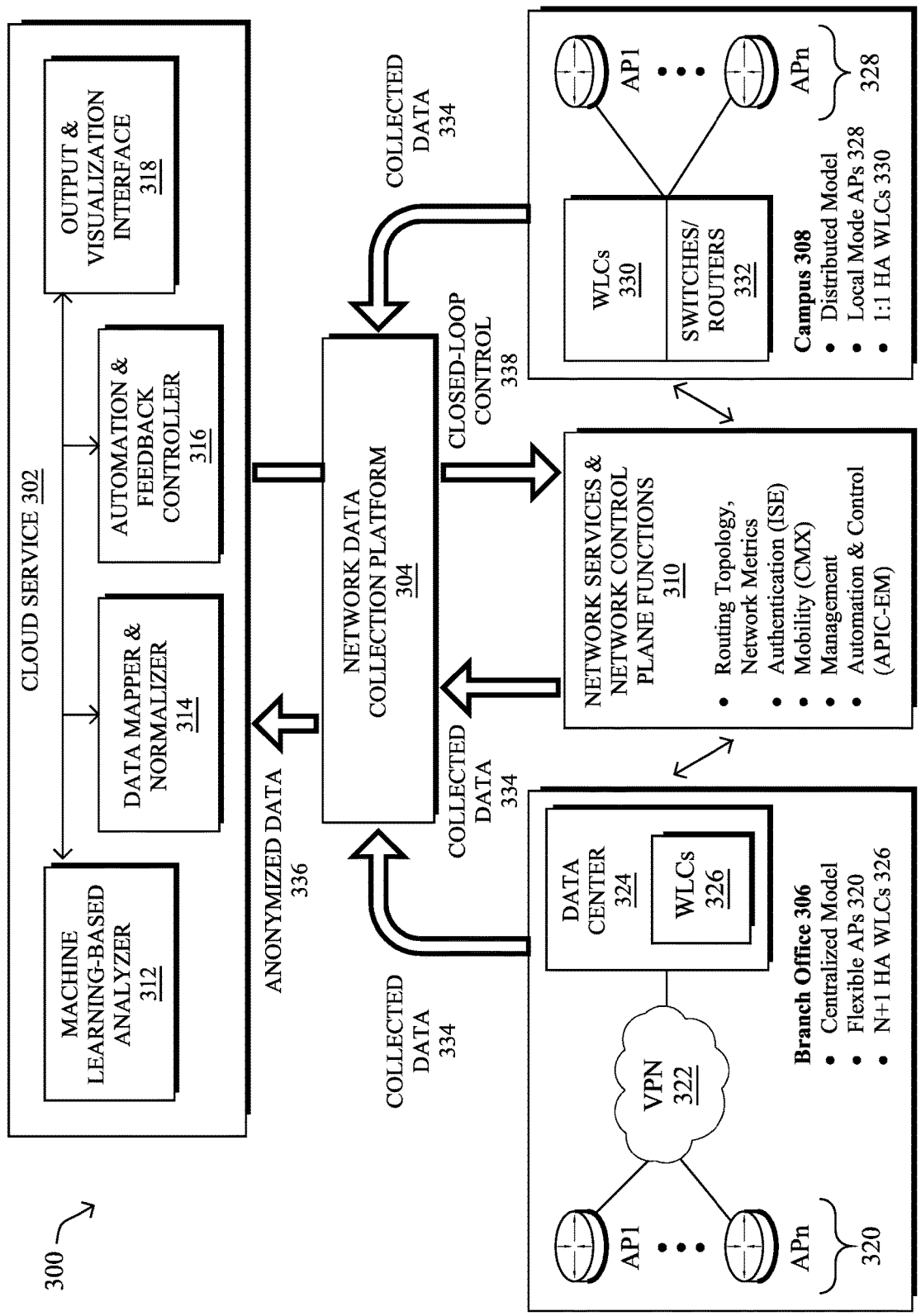
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, networking device failures have been a main concern in high availability networks and such failures can be caused by a number of causes: resources saturation poorly handled, software bugs of many sorts (e.g., incorrect pointers), memory leaks, and the like. Of these causes, software malfunctions account for a large percentage of networking device failures. Thus, debugging the main causes of errors in a given version of a network software stack is key to reducing or eliminating these failures.

Unfortunately, the networking software stack is a complex piece of software that provides seamless interaction between a large number of edge devices and other networking devices. Ensuring that this software stack always performs without causing any setbacks (e.g., radio resets, router failures, etc.) is almost impossible. Indeed, although advanced development testing strategies, such as unit testing, stress testing, white/black box testing, etc., have been developed over the past two decades, the number of features interacting with each other prevents the testing of all of them in combination.

Detecting Bug Patterns Across Evolving Network Software Versions

The techniques herein introduce systems and methods for proactively tracking network failures across different versions of network software. In one aspect, the techniques automatically activate data-collection for measuring required parameters that may influence the bug/crash. In another aspect, the techniques herein may utilize the data to discover the bug pattern using machine learning. This aids in cutting down the testing and bug-fixing time by providing insights into the probable reason for the bug or the device failure. In a further aspect, the techniques herein can be used to showcase the evolution of the bug and its pattern as the network software evolves into different versions, which enables developers to track whether the main causes are fixed or whether new emergent patterns of bugs appear in newer versions of the software.

Specifically, according to one or more embodiments of the disclosure as described in detail below, a network assurance service that monitors a network receives telemetry data regarding monitored characteristics of the network. The service identifies, using a machine learning-based pattern analyzer, a pattern of the monitored characteristics that are associated with failures experienced by one or more networking devices in the network. The service groups networking devices by software version. The service determines probabilities of the pattern being observed concurrently with failures of the grouped network networking devices. A particular probability is associated with a particular group of the networking devices executing a particular software version. The service provides, based on the determined probabilities, data regarding the identified pattern and software versions for display.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
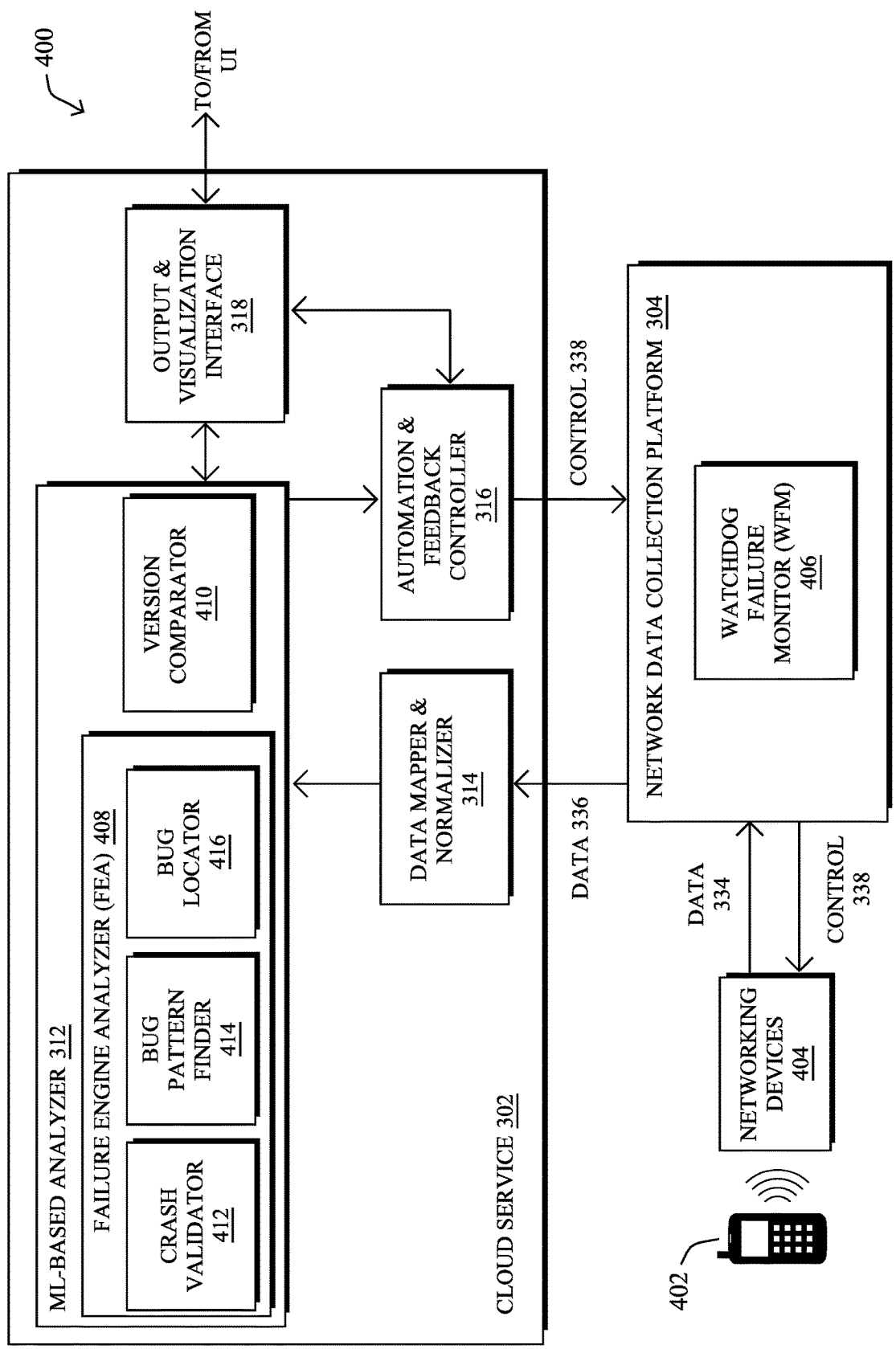
FIG. 4 illustrates an example architecture for detecting bug patterns across evolving network software versions.

Operationally, FIG. 4 illustrates an example architecture 400 for detecting bug patterns across evolving network software versions, according to various embodiments. At the core of architecture 400 may be the following components: a watchdog failure monitor (WFM) 406, a failure engine analyzer (FEA) 408, and/or a version comparator 410. In some implementations, the components of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312), as part of network data collection platform 304, and/or on one or more networking devices 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, the watchdog failure monitor (WFM) 406 may be hosted on premises with that of networking devices 404 (e.g., routers switches, APs, WLCs, etc.). For example, WFM 406 may be a component of network data collection platform 304 that communicates with the machine learning-based analyzer 312 of cloud service 302. During execution, WFM 406 may send custom IPv4 or IPv6 messages to cloud service 302 to: 1.) report failures experienced by networking devices 404 of interest (e.g., AP radio resets, AP crashes, WLC failures, router failures, switch failures, etc.) and 2.) provide the required telemetry data requested by machine learning-based analyzer 312.

In a first mode of operation, WFM 406 may be explicitly programmed by failure engine analyzer (FEA) 408, to keep track of a set of variables and several types of failures that are of interest. For example, WFM 406 may store, in a rotating (local) buffer, a list of variables $L_v$ values sampled at a given frequency, optionally accompanied by raw traffic and/or aggregated traffic statistics such as (sampled) Netflow or IPFIX records. In response to detecting a failure of interest, WFM 406 may sends the list $L_v$ to FEA 408 (e.g., as part of data 336), along with the set of related timestamps.

In some embodiments, architecture 400 may also include failure engine analyzer (FEA) 408, which itself may comprise one or more sub-components, such as crash validator 412, bug pattern finder 414, and/or bug locator 416, as shown. Generally, these subcomponents 412-416 may operate in conjunction with one another to assess the data reported by WFM 406 regarding failures experienced by networking devices 404.

Crash validator 412 may be configured to ensure that the set of variables received from WFM 406 for a given failure type is valid. Notably, crash validator 412 may assess the reported data from WFM 406, to determine whether a reset or other crash was actually caused by a failure. For example, assume that data 336 includes radio-reset codes generated by radios/APs in networking devices 304. In such a case, crash validator 412 may analyze the reported codes, to determine whether these are signs of actual failures or part of the regular operational procedures of the monitored network (e.g., radios being reset when the interface is manually brought up or down, etc.).

Another sub-component of FEA 408 is bug pattern finder 414, in some embodiments. In general, bug pattern finder 414 is responsible for finding the exact patterns when a particular failure occurs. Bug pattern finder 414 may analyze the received telemetry data from WFM 406, such as the observed wireless interference, packet counts, device information (e.g., CPU and memory usage, software and/or hardware information, etc.), the number clients attached to an AP, etc. Bug pattern finder 414 may also optionally request data that corresponds to normal network conditions, which can be used to train a machine learning-based classifier for a given failure with both positive and negative samples from the monitored network.

Bug pattern finder 414 may utilizes machine learning to extract the pattern(s) which are most dominant/prevalent when the failures occur. In one embodiment, bug pattern finder 414 may use the samples of features that are received via the reported telemetry, as well as the crash labels from crash validator 412, to determine the bug pattern. For example, bug pattern finder 414 may incorporate an interpretable model, such as a decision tree or association rule mining, which can be used to determine that the most occurrences of the bug happen when the range of input features is in a certain range.

Another optional sub-component of FEA 408 is bug locator 416, in some embodiments. During execution, bug locator 416 may be responsible for locating the portion(s) of the software code executed by a networking device 404 that triggered the software crash/device failure. Note that bug locator 416 is optional and can be instantiated only if code-level data is available from WFM 406. For example, this code-level data may include stack traces of the executing software from when the device failure occurred. Further examples of data that bug locator 416 may assess can include, but are not limited to, the device telemetry (e.g., SNMP traces), syslog traces, a listing of running applications on the device, the resource consumptions of these applications (e.g., in terms of CPU, memory, etc.), and the like. In turn, bug locator 416 may identify the common parts of the code that are visited during crashes using graph-based machine learning and data-mining (e.g., PrefixSpan or sub-trajectory clustering).

Another component of architecture 400 may be version comparator 410, in some embodiments. During execution, version comparator 410 may first arrange the versions of network software based on the time-line on when the versions were released or based on the time-sequence of when the different versions were installed to networking devices 404. The bug patterns for each of these versions are fetched or computed by bug pattern finder 414. In turn, version comparator 410 may provide the summary patterns (e.g., the patterns identified by the decision tree) for display in chronological fashion. Notably, version comparator 410 may provide the data regarding the identified pattern and software versions to output and visualization interface 318 for display by the user interface (UI). This enables a data-drive assessment of the new software version, such as whether the new version has fixed the issue that was due to the previously detected pattern(s). In addition, it can also show emergent patterns, e.g., the patterns which were not there in the previous versions, but were introduced in the new version.

Said differently, some software versions have many more failures than other versions, and the pattern discovered during failures are not the same across all versions. Version comparator 410 groups the versions of software which have similar failure/bug "patterns." This enables the developers to check whether:
  a prominent pattern emerges in a new software version (e.g., WLC version, etc.).
  the versions of code which have similar patterns. This allows developers to know whether there is a recurring pattern across recent software versions that need attention to fix.

Figure 5:
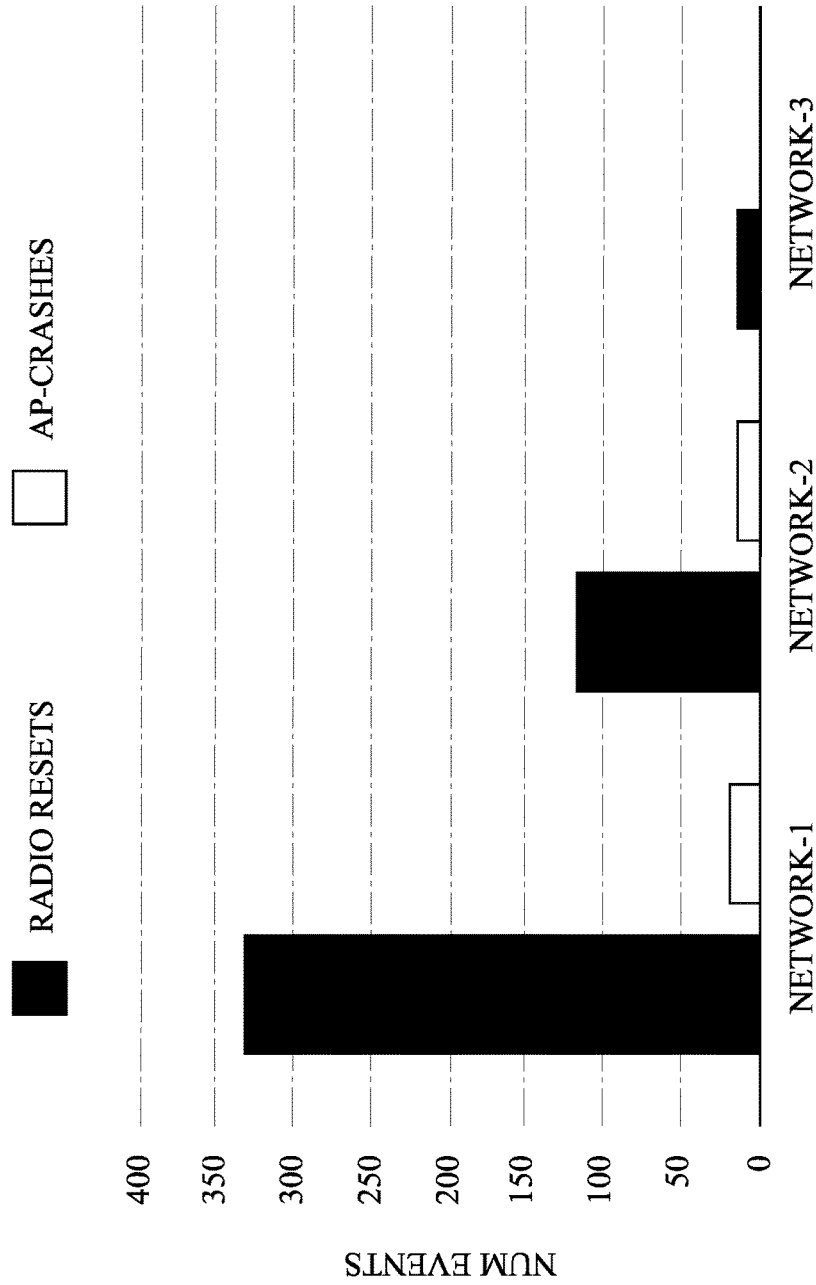
FIG. 5 illustrates an example plot of networking device failures.

A prototype of the techniques herein was constructed using datasets from a plurality of different networks, and across different sets of networking devices and software versions. FIG. 5 illustrates an example plot 500 of networking device failures extracted from these datasets. In particular, as shown, two types of failures were assessed: 1.) radio resets (e.g., by APs), and 2.) AP crashes. By definition, radio reset failures refer to those radio resets due to actual failures, as opposed to manual and other planned resets. Testing has shown that radio resets occur frequently in wireless networks, and often affect around 2% of the radios. AP crashes happen when the access point, along with all the radios on the AP, crashes. Both of these events are severe events, which is usually fixed by resetting or rebooting the device. In each of the three observed networks, radio reset failures occurred more often than AP crashes.

Figure 6:
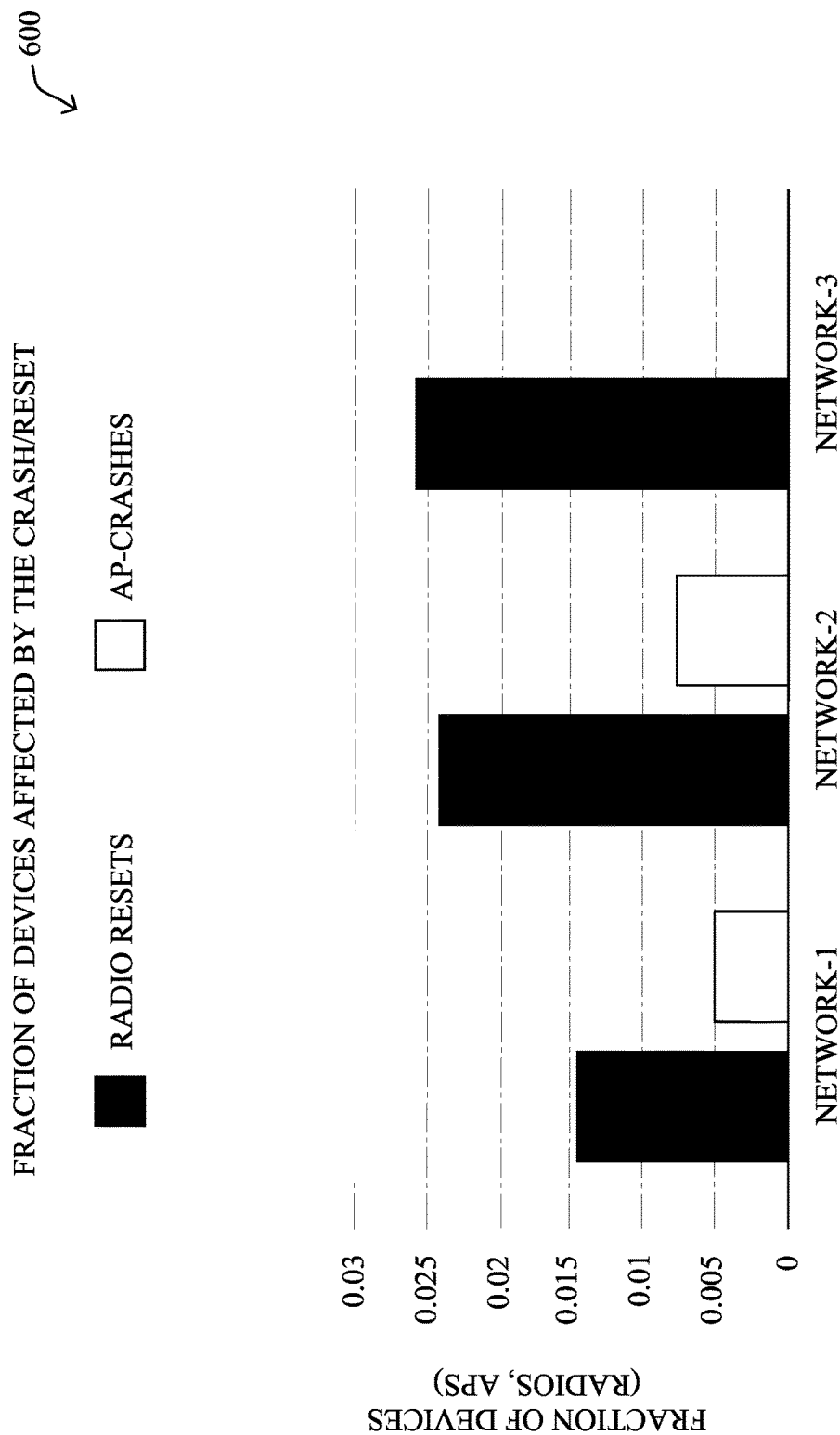
FIG. 6 illustrates an example plot of the impacts of networking device failures.

FIG. 6 illustrates an example plot 600 of the impacts of networking device failures from FIG. 5. Notably, plot 600 illustrates the observed fraction of devices that were affected by the different failure types in each of the three monitored networks over an observation period of several months. Note that each of the monitored networks may have a different number of devices (e.g., APs and radios). While relatively infrequent, these failures also usually affect a small percentage of networking devices (e.g., 0.5% to 3%). Because of this infrequent nature, it is essentially impossible to simulate these failures in a test environment, prior to releasing a new software version.

Figure 7:
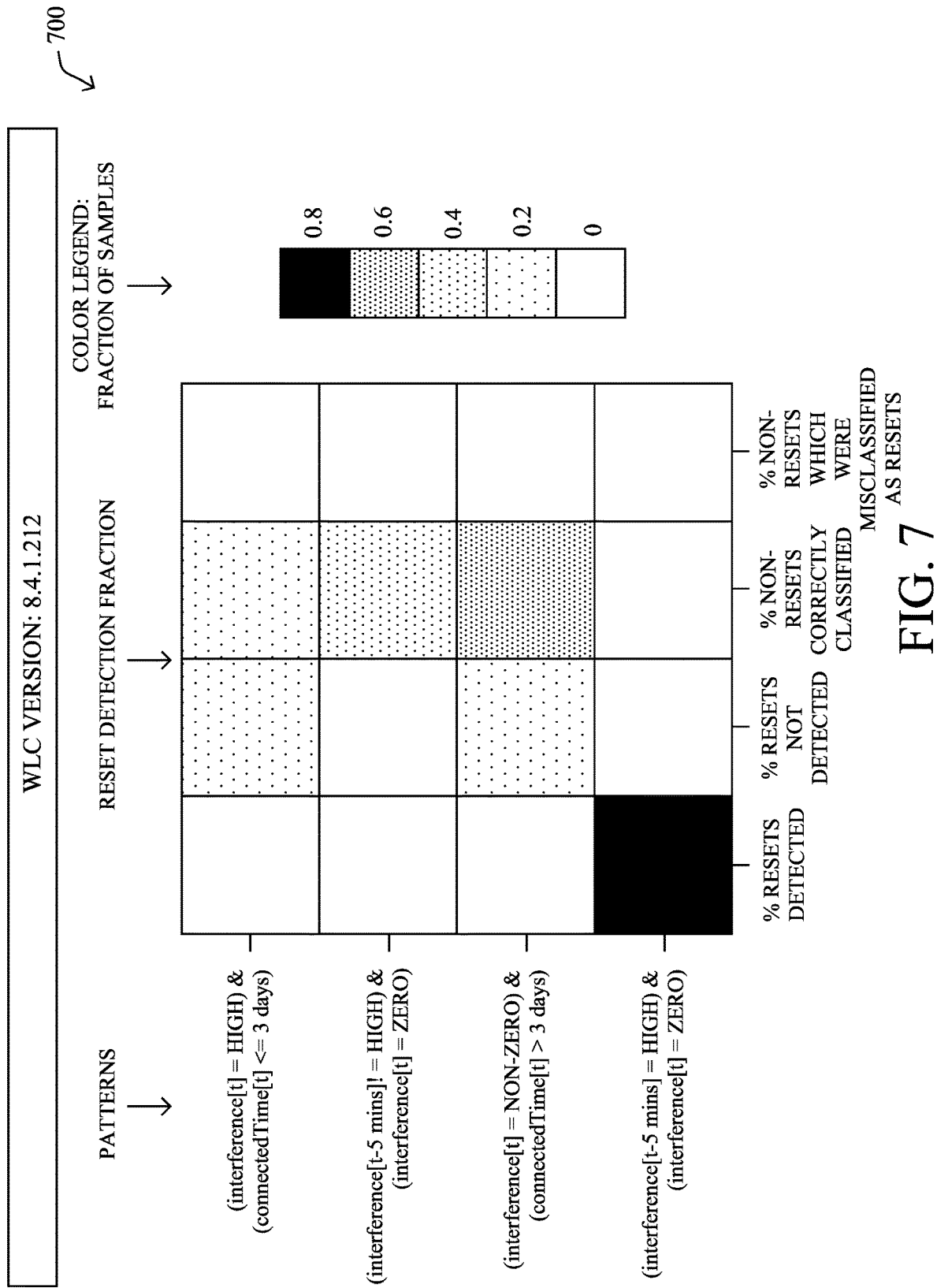
FIG. 7 illustrates an example mapping of failures to observed patterns for a particular software version.

FIG. 7 illustrates an example mapping 700 of failures to observed patterns for a particular software version. Notably, during prototype testing, a machine learning-based decision tree was trained and used to assess the captured telemetry data from the subject networks vis-à-vis the observed device failures. In particular, mapping 700 plots a heatmap of the patterns identified by the bug pattern finder of the prototype on the y-axis and the strength of the pattern (e.g., % of resets detected) on the x-axis. These patterns were also assessed in relation to the group of networking devices that were controlled using version 8.4.1.212 of the WLC software. The specific type of device failure in mapping 700 was radio resets.

As shown, the prototype identified four patterns of network characteristics that co-occurred with the observed radio reset failures:
  High interference at the time of failure and a connected time ≤3 days
  Interference 5 minutes prior to the failure that was not high (e.g., low or medium interference) and no interference at the time of failure
  A non-zero interference at the time of failure and a connected time >3 days
  High interference 5 minutes prior to the failure and no interference at the time of failure Mapping 700 also plots the strengths of the model in relation to the failures experienced by the networking devices associated with version 8.4.1.212 of the WLC software. In other words, the prototype assessed each of the patterns shown in mapping 700, to see how well these patterns were at predicting the occurrence of a failure by a device associated with this particular software version. For example, "% of resets not detected" on the x-axis describes the fraction of the resets that failed to be detected by the machine learning pattern finder. Note that this fraction has to be very small for a strong pattern for resets, which is the case in the above example.

As shown, a significant fraction of the resets (more specifically, $^{99}/_{107}$ or 93% of resets) occur when the wireless interference goes from a significant/high value to zero in 5 minutes. In contrast, radio reset failures were found not to occur when the interference is generally low for a long duration of time (e.g., the second pattern in mapping 700). By providing data indicative of mapping 700 to a display, the developer may infer that almost all radio reset failures for version 8.4.1.212 of the WLC software when, say, the interference sensed by the device is either hung or not responding. From this pattern, the developer may infer that almost all radio-resets are happening in this version of the wireless controller code when, say, the interference sensing in the radio being hung or not responding.

Similar patterns were also found during testing for WLC software version 8.3.104.61. Hence, it is certain that the new version (8.4.1.212) has not fixed the problems in the pre-existing version (8.3.104.61).

Similarly, for AP crashes, univariate analysis was used during prototyping to show that these crashes also had dominant patterns. From testing it was shown that some AP models were more vulnerable than others. The below table shows the statistics of a few AP models that experienced an AP crash. Note that there are many more AP models with no crashes reported. These models are omitted from Table 1 below.

TABLE 1

| Model | numPositives | Total | fracPositives |
|---|---|---|---|
| 3602 | 1 | 439 | 0.002278 |
| 1532 | 7 | 3793 | 0.001846 |
| 3702 | 5 | 6992 | 0.000715 |

TABLE 1-continued

| Model | numPositives | Total | fracPositives |
|---|---|---|---|
| 3602 | 3 | 8805 | 0.000341 |
| 3702 | 18 | 61038 | 0.000295 |

Table 1 above shows the statistics for each AP model: the number of times an AP crash failure was reported (numPositives), the total number of times the AP was reported to be observed (total), and the fraction of the times when such a model of AP had a crash (fracPositive). The higher the fracPositive, the greater that susceptibility of the particular AP model to an AP crash. This provides the information to the developer team that some versions of software may cause crashes due to model-specific features.

A prototype bug locator was also constructed. Recall that bug locator 416 is an optional sub-component of FEA 408 that can point out the possible parts/modules of the code that can trigger failures. This module can be enabled if the WFM can monitor data related to code (such as a stack-trace) when the device failure happens. In particular, consider a stack-trace when one crash happened: $\{F_n X \rightarrow F_n Y \rightarrow F_n Z \rightarrow \text{Crash}\}$, where $F_n$ is a function within a particular file or a class. In one embodiment, the bug locator may represent the stack traces when all crashes happened as a graph, where every function call "$F_n\text{<i>}$" is a node, and there is a directed hyper-edge or path between a set of functions when there is one such stack-trace present. In this graph of paths, the bug detector may estimate the common flow of events when a crash occurred. This can be estimated by computing most-common sub-path found (by using processes such as PrefixSpan or Sub-trajectory clustering approaches). These paths are indicative of commonly occurring paths that lead to device crash, and help the development team to focus on certain functions as starting points for troubleshooting the crash.

A prototype version comparator was also constructed and configured to present the chronological patterns observed across different versions of the software to the developer. With such a capability, the development team can find out if a particular pattern that was exhibited during device failures has been fixed in the subsequent versions, or if there are any new emergent patterns in the new version of the software.

Figure 8:
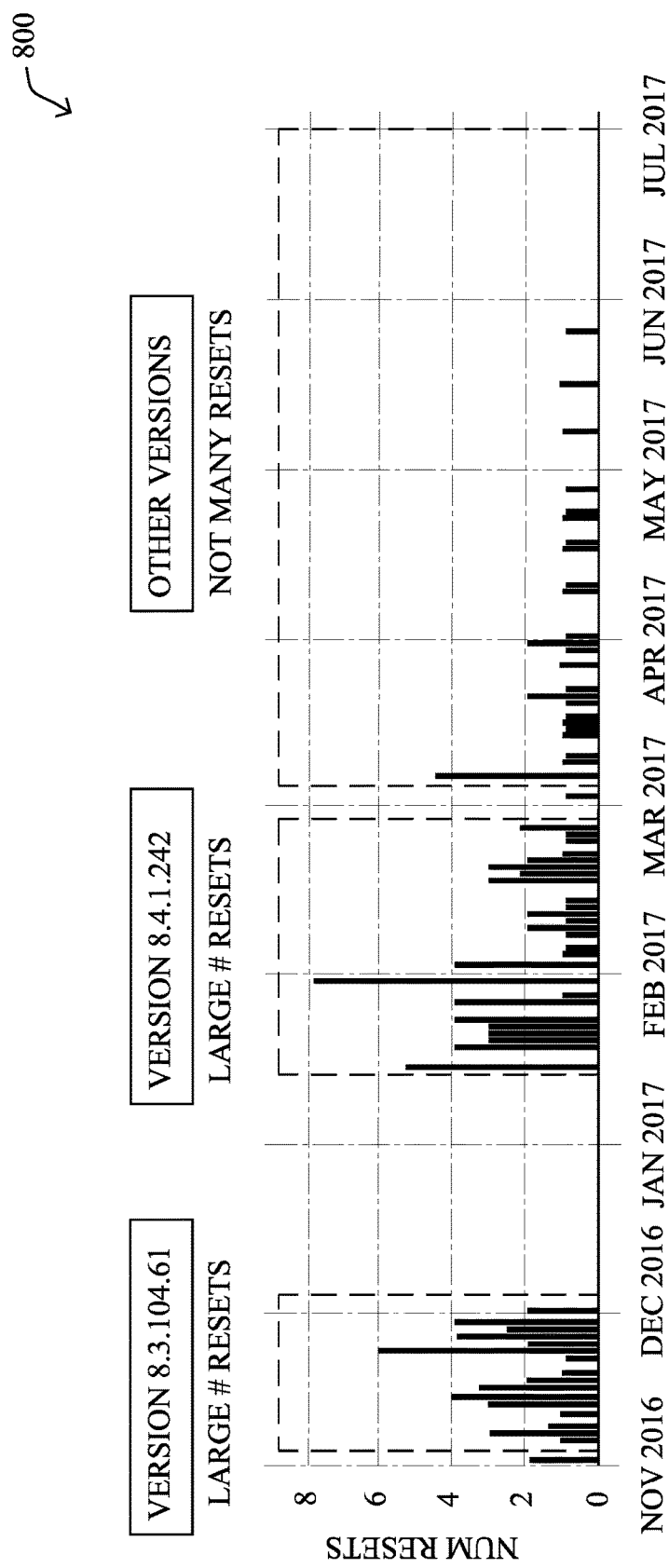
FIG. 8 illustrates an example timeline of device failures by software version.

FIG. 8 illustrates an example timeline 800 of device failures by software version, in some embodiments. As shown, version comparator may group networking devices by software version within timeline 800 and depict the number of resets or other failures per version within the display data. In some embodiments, the version comparator may also provide an indication of the most prominent pattern for each version. For example, in the case of version 8.3.104.61, the most prominent pattern was high interference five minutes before the failure and zero interference during, indicating a sharp drop in the interference. This pattern had a 70% probability of co-occurring with failures for this version. Similarly, the same pattern may have a pattern probability of 94% for version 8.4.1.242. Thus, it can be seen that the number of radio resets was significantly large in versions "8.3.x" and "8.4.1.242" and that the underlying patterns/causes were also similar and did not change until version 8.4.1.242. This kind of insight could have been proactively provided to developers by the version comparator, thereby enabling the developers to fix the problem without waiting for a long time for the customer to report.

Figure 9:
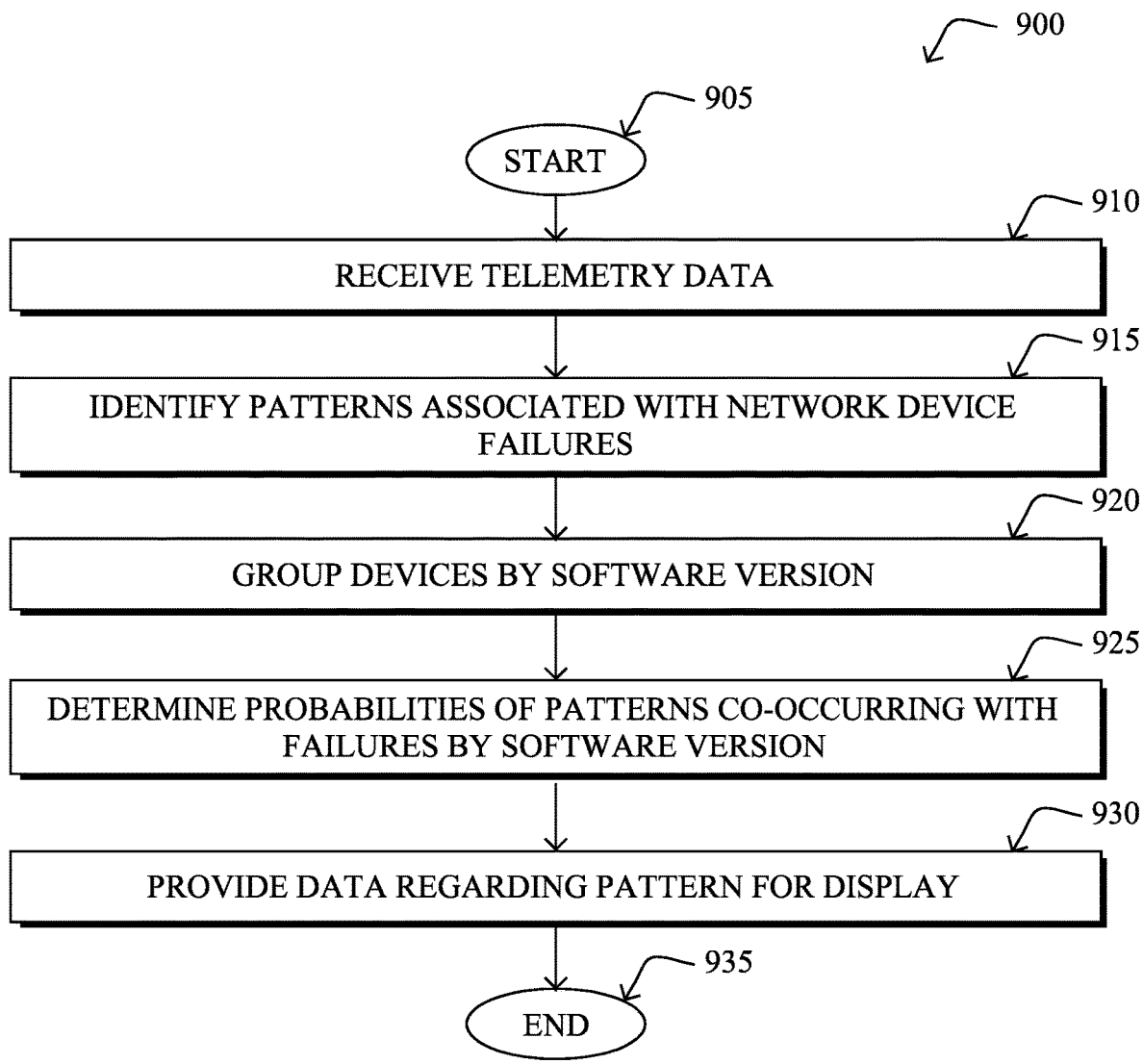
FIG. 9 illustrates an example simplified procedure for detecting bug patterns across evolving network software versions.

FIG. 9 illustrates an example simplified procedure 900 for detecting bug patterns across evolving network software versions in a network in accordance with one or more embodiments described herein. For example, a non-generic, specifically configured device (e.g., device 200) may perform procedure 900 by executing stored instructions (e.g., process 248), to provide a network assurance service to one or more monitored networks. The procedure 900 may start at step 905, and continues to step 910, where, as described in greater detail above, the service may receive telemetry data regarding monitored characteristics of the network. Such telemetry data may include, but is not limited to, traffic metrics (e.g., traffic volumes, packet sizes, packet counts, bandwidth consumption, etc.), wireless interference metrics, wireless channel information (e.g., which channel is used by an AP), the number of clients attached to an AP, device resource utilization, and the like. In further embodiments, the telemetry data may also include trace information indicative of the portion(s) of software executing when a failure occurred. In other words, the telemetry data may be indicative of the operational and/or environmental state of the monitored network surrounding a device failure.

At step 915, as detailed above, the service may use a machine learning-based pattern analyzer to detect a pattern of the monitored characteristics that are associated with failures experienced by one or more networking devices in the network. For example, such failures may include, but are not limited to, radio resets (e.g., of a wireless AP), device crashes (e.g., wireless controller crashes, switch crashes, router crashes, etc.). In some embodiments, the service may first filter out those crashes that are unexpected or undesired from those that are planned or otherwise expected (e.g., radio resets that are performed manually, manual device reboots, etc.).

At step 920, the service may group the networking devices by software version, as described in greater detail above. For example, certain failures may occur when a given networking device is executing software version 2.2, while other failures may occur when the device is executing software version 3.1.

At step 925, as detailed above, the service may determine probabilities of the pattern being observed concurrently with failures of the grouped network networking devices. In various embodiments, a particular probability is associated with a particular group of the networking devices executing a particular software version. For example, the pattern of "interference going from HIGH to ZERO" before a crash of software version 2.2 may have a probability of 0.92, whereas the pattern may have only a 0.04 probability when software version 3.1 is used.

At step 930, the service may provide, based on the determined probabilities, data regarding the identified pattern and software versions for display, as described in greater detail above. The service may, for example, display a timeline of device failures and software version for display. In addition, the service may display the most prominent pattern(s) associated with the failures by software version, thereby allowing the user to review which patterns are most associated with the failures, as well as determine whether these patterns are consistent across different software versions. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of bug patterns across evolving network software versions. This differs considerably from other approaches that rely on pre-existing reports, such as bug reports, which do not detect the underlying behavioral patterns (or context) under which the failures occur. Such predictions can be used by software developers to perform root-cause analysis and address the underlying bugs.

While there have been shown and described illustrative embodiments that provide for detecting bug patterns across evolving network software versions, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a network assurance service that monitors a network, telemetry data regarding monitored characteristics of the network;
   identifying, by the service and using a machine learning-based pattern analyzer, a pattern of the monitored characteristics that are associated with failures experienced by one or more networking devices in the network, wherein the monitored characteristics comprises stack trace information indicative of a portion of software executing when the failures occurred and the pattern is identified by:
      constructing, based on the stack trace information, a graph of transitions between functions of the executing software, and
      identifying a path in the graph that frequently co-occurs with the failures;
   grouping, by the service, networking devices by software version;
   determining, by the service, probabilities of the pattern being observed concurrently with failures of the grouped network networking devices, wherein a particular probability is associated with a particular group of the networking devices executing a particular software version; and
   providing, by the service and based on the determined probabilities, data regarding the identified pattern and software versions for display.

2. The method as in claim 1, wherein the failures are radio resets or device crashes.

3. The method as in claim 1, wherein the network devices comprise one or more of: wireless access points, access point controllers, network switches, or network routers.

4. The method as in claim 1, wherein the monitored characteristics comprise one or more of: wireless interference, packet counts, or number of clients attached to a wireless access point.

5. The method as in claim 1, further comprising:
   analyzing, by the network assurance service, radio reset codes to identify the failures.

6. The method as in claim 1, wherein the machine learning-based pattern analyzer comprises a decision tree.

7. The method as in claim 1, wherein providing the data regarding the identified pattern and software versions for display comprises:
   sending display data to a user interface indicative of a timeline of device failures and software versions.

8. An apparatus, comprising:
   one or more network interfaces to communicate with a network;
   a processor coupled to the network interfaces and configured to execute one or more processes; and
   a memory configured to store a process executable by the processor, the process when executed configured to:
      receive telemetry data regarding monitored characteristics of the network;
      identify, using a machine learning-based pattern analyzer, a pattern of the monitored characteristics that are associated with failures experienced by one or more networking devices in the network, wherein the monitored characteristics comprises stack trace information indicative of a portion of software executing when the failures occurred and the pattern is identified by:
         constructing, based on the stack trace information, a graph of transitions between functions of the executing software, and
         identifying a path in the graph that frequently co-occurs with the failures;
      group networking devices by software version;
      determine probabilities of the pattern being observed concurrently with failures of the grouped network networking devices, wherein a particular probability is associated with a particular group of the networking devices executing a particular software version; and
      provide, based on the determined probabilities, data regarding the identified pattern and software versions for display.

9. The apparatus as in claim 8, wherein the failures are radio resets or device crashes.

10. The apparatus as in claim 8, wherein the network devices comprise one or more of: wireless access points, access point controllers, network switches, or network routers.

11. The apparatus as in claim 8, wherein the monitored characteristics comprise one or more of: wireless interference, packet counts, or number of clients attached to a wireless access point.

12. The apparatus as in claim 8, wherein the process when executed is further configured to:
   analyze radio reset codes to identify the failures.

13. The apparatus as in claim 8, wherein the machine learning-based pattern analyzer comprises a decision tree.

14. The apparatus as in claim 8, wherein the apparatus provides the data regarding the identified pattern and software versions for display by:
  sending display data to a user interface indicative of a timeline of device failures and software versions.

15. A tangible, non-transitory, computer-readable medium storing program instructions that cause a network assurance system that monitors a network to execute a process comprising:
  receiving, at a network assurance service, telemetry data regarding monitored characteristics of the network;
  identifying, by the service and using a machine learning-based pattern analyzer, a pattern of the monitored characteristics that are associated with failures experienced by one or more networking devices in the network, wherein the monitored characteristics comprises stack trace information indicative of a portion of software executing when the failures occurred and the pattern is identified by:
    constructing, based on the stack trace information, a graph of transitions between functions of the executing software, and
    identifying a path in the graph that frequently co-occurs with the failures;
  grouping, by the service, networking devices by software version;
  determining, by the service, probabilities of the pattern being observed concurrently with failures of the grouped network networking devices, wherein a particular probability is associated with a particular group of the networking devices executing a particular software version; and
  providing, by the service and based on the determined probabilities, data regarding the identified pattern and software versions for display.

16. The computer-readable medium as in claim 15, wherein the failures are radio resets, and wherein the networking devices comprise wireless access points or controllers for wireless access points.

17. The computer-readable medium as in claim 15, wherein the monitored characteristics comprise one or more of: wireless interference, packet counts, or number of clients attached to a wireless access point.

18. The computer-readable medium as in claim 15, wherein the machine learning-based pattern analyzer comprises a decision tree.

19. The computer-readable medium as in claim 15, wherein the service provides the data regarding the identified pattern and software versions for display by:
  sending display data to a user interface indicative of a timeline of device failures and software versions.

20. The computer-readable medium as in claim 15, wherein the failures are radio resets or device crashes.

\* \* \* \* \*